No. 747,092. PATENTED DEC. 15, 1903.
E. H. SENECHAL.
FLOUR SIFTER.
APPLICATION FILED MAY 28, 1903.
NO MODEL.
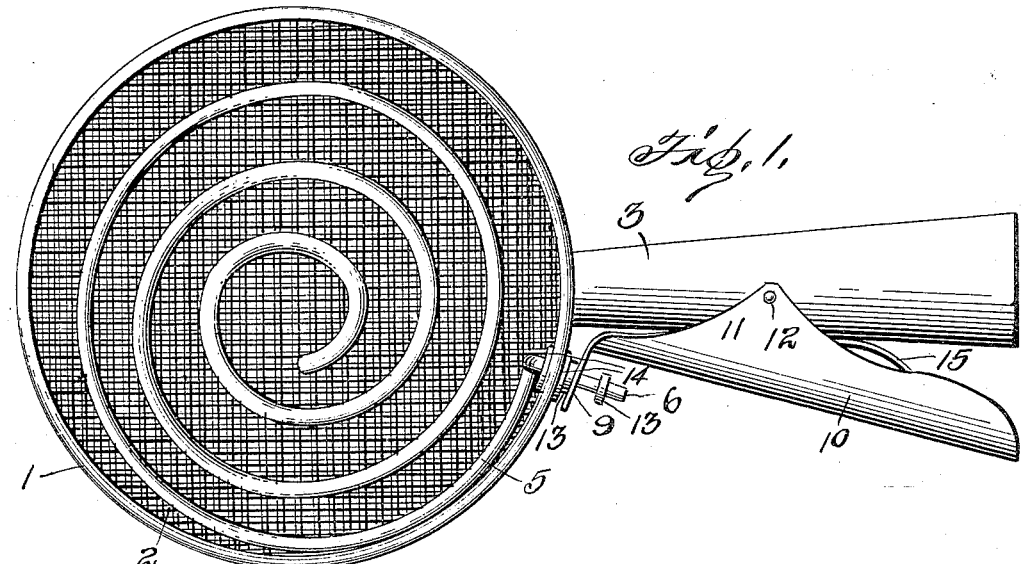
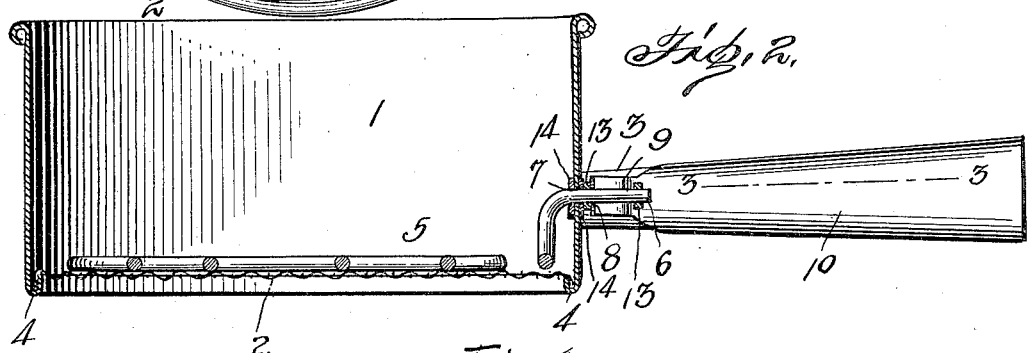
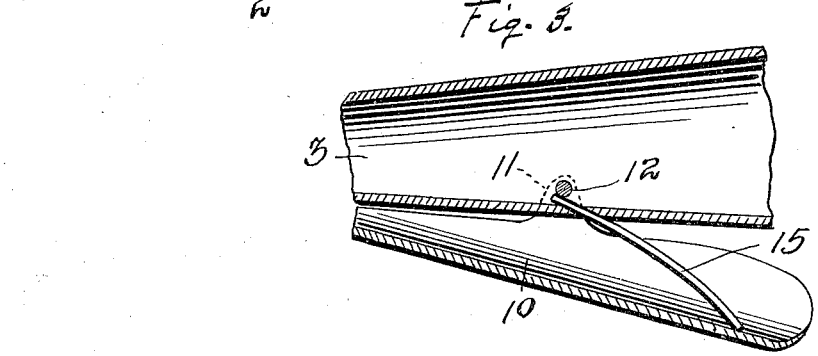
Witnesses
Inventor
E. H. Senechal,
By
Attorney No. 747,092. Patented December 15, 1903.

UNITED STATES PATENT OFFICE.

EDWARD H. SENECHAL, OF PIERRE, SOUTH DAKOTA.

FLOUR-SIFTER.

SPECIFICATION forming part of Letters Patent No. 747,092, dated December 15, 1903.

Application filed May 28, 1903. Serial No. 159,182. (No model.)

*To all whom it may concern:*

Be it known that I, EDWARD H. SENECHAL, a citizen of the United States, residing at Pierre, in the county of Hughes and State of South Dakota, have invented certain new and useful Improvements in Flour-Sifters; and I do declare the following to be a full, clear, and exact description of the invention, such as will enable others skilled in the art to which it appertains to make and use the same.

My invention relates to certain new and useful improvements in flour-sifters.

The object of the invention is to improve and simplify the construction of this class of devices and render them more durable in use and efficient in operation.

A further object is to provide a sifter which may be held and operated by one hand to permit the dough to be kneaded by the other.

With these and other objects in view the invention consists of certain novel features of construction, combination, and arrangement of parts, as will be more fully described, and particularly pointed out in the appended claim.

In the drawings, Figure 1 is a top plan view of my improved flour-sifter. Fig. 2 is a vertical sectional view through the same, taken on the line 2 2 of Fig. 1. Fig. 3 is a detail horizontal sectional view taken on the line 3 3 of Fig. 2.

Referring to the drawings by numeral, 1 denotes a casing or receptacle in the form of a tubular sheet-metal body having a foraminous bottom 2 and a laterally-projecting fixed handle 3. The bottom 2 may be of any perforated material, but is preferably a woven-wire sieve of any desired mesh to properly grade the flour. This sieve is secured by clamping its downturned edge in the beaded lower edge 4 of the body 1.

5 denotes an agitator, in the form of a wire coil, which is adapted to rest upon the top of the sieve 2 and to be oscillated to facilitate the sifting of the flour. As shown in Fig. 1, this agitator consists of a spirally-coiled spring-wire whose coils or convolutions lie in the same plane and the outer end of which is formed into an arm 6, which projects through an opening or aperture 7 in the body 1. The outer end of this arm 6 passes through an opening 8 in the bent end 9 of an operating hand-lever 10. The hand-lever 10 is curved in cross-section, conforming in shape to the handle 3, to which it is pivoted by providing ears 11 at about the center of said lever and passing a pivot-bolt or pin 12 through them and the said handle 3. As stated, the arm 6 of the agitator passes through the end 10 of the lever and is retained in the same by providing a collar 13 upon each side of said lever. This construction permits of a loose pivotal connection between said parts, so that when the lever 10 is manipulated the arm 6 will be moved outwardly or inwardly and at the same time it will be swung to either side in an arc-shape path, the aperture or hole 7 acting as a fulcrum for the arm 6. In order to strengthen the wall of the said aperture and prevent rapid enlargement of the same by wear, I reinforce the same upon the inner and outer sides of the body 1 by the plates 14. Secured to the handle 3 beneath the lever 10 is a flat steel spring 15, the free end of which bears upon the inner side of the outer end of the lever 10, as clearly shown in Fig. 3, while the inner end projects through an opening in the handle 3 and bears against the pin 12 and wall of the handle, and thus locks the springs against casual displacement.

In operating the device the handle 3 is grasped in one hand and the hand-lever 10 is manipulated—that is, alternately pressed toward the handle 3 and then released to permit the spring 15 to move it away. The movement of the inner end 9 of the lever 10 will reciprocate the arm 6 of the agitator inwardly and outwardly and at the same time oscillate or swing it laterally to cause the agitator to move in an arc-shaped path. The agitator will thus disintegrate the flour and cause it to sift through the screen 2.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim, and desire to secure by Letters Patent, is—

A sifter comprising a sifting-receptacle having a screen-bottom and provided with a fulcrum-opening in its side wall, a handle fixed to the said side wall adjacent to said opening, an agitator within the receptacle consisting of a wire strand bent to form a flat spiral coil resting on the screen-bottom, one end of the said strand being bent upward and rebent laterally, the rebent portion forming an arm which projects outward through said fulcrum-opening, a laterally-swinging folded or channeled lever having a lateral end loosely connected to the arm to oscillate the agitator, ears embracing the handle, a pivot-pin connecting said ears to the handle, and a retracting ribbon-spring inclosed within said folded or channeled lever and bearing at one end thereon and at the other end extending through an opening in the handle and bearing on the pivot-pin of the lever, whereby it is clamped between the pin and wall of the handle and locked thereby against casual displacement, substantially as described.

In testimony whereof I have hereunto set my hand in presence of two subscribing witnesses.

EDWARD H. SENECHAL.

Witnesses:
CORWIN D. MEAD,
WALTER S. ROWE.